Figure 4:
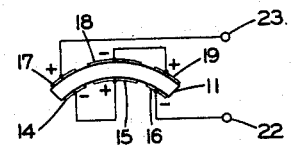

July 18, 1950

C. K. GRAVLEY 2,515,446

ELECTROMECHANICAL TRANSDUCER

Filed June 12, 1948

2 Sheets-Sheet 1

INVENTOR.
CHARLES K. GRAVLEY
BY
*Harries A. Mumma Jr.*
ATTORNEY

July 18, 1950     C. K. GRAVLEY     2,515,446
ELECTROMECHANICAL TRANSDUCER

Filed June 12, 1948     2 Sheets-Sheet 2

INVENTOR.
CHARLES K. GRAVLEY
BY
Harries A. Mumma Jr.
ATTORNEY

Patented July 18, 1950

2,515,446

UNITED STATES PATENT OFFICE 2,515,446

ELECTROMECHANICAL TRANSDUCER

Charles K. Gravley, Lakewood, Ohio, assignor to The Brush Development Company, Cleveland, Ohio, a corporation of Ohio Application June 12, 1948, Serial No. 32,587

13 Claims. (Cl. 171—327)

This invention relates to an improved electromechanical transducer, and more particularly to such a transducer including a body of electromechanically sensitive dielectric material capable of being formed conveniently into shapes having curved surfaces.

In the design of transducers utilizing electromechanically sensitive material it frequently is desirable to employ materials sensitive to expansion and contraction. Thus, so-called expander bars of piezoelectric material have been used in such transducers. These bars are electroded on two opposed major surfaces and tend to expand or contract longitudinally when a voltage of the proper polarity is impressed across the electrodes. However, for convenience of mechanical design, for proper matching of mechanical impedances, and for efficiency of electro-mechanical action, it may be expedient to convert this expansive or contractive motion into a bending motion. Transducers utilizing such a bender effect have proved commercially successful; these transducers may be made by cementing together two expander bars at an electroded face of each bar, forming a sandwich with a central electrode. Signal voltages then are applied in opposite polarities to the two bars affixed to each other, causing a tendency for one bar to expand longitudinally and simultaneously for the other bar to contract. The resultant motion is a bending motion. Conversely, when the transducer is subjected to a stress tending to cause a similar bending, an electrical charge appears on the electrodes.

While the sandwich type of bender element just described has proved highly successful in many applications, it has several disadvantages which may render it less desirable under some circumstances. Principal among these disadvantages is the difficulty of affixing together two electroded surfaces of the two expander bars. High shearing forces act at the interface between these surfaces during operation of the transducer, and any tendency of the affixed surfaces to separate or to yield to these shearing forces causes a decrease in the efficiency of the transducer.

Until recently transducers utilizing electromechanically sensitive dielectric material invariably contained plates, bars, or similar shapes cut from single crystals of a piezoelectric substance. It has been proposed, however, to use instead suitably prepared polycrystalline dielectric materials, notably the titanates of certain alkaline earth metals. Certain of these polycrystalline dielectric materials exhibits to a notable degree the property of developing substantial mechanical strains when subjected to electrostatic fields. In the copending application Serial No. 740,460, filed April 9, 1947, in the name of Hans Jaffe and assigned to the same assignee as the present invention, there is described and claimed a transducer element comprising a body of dielectric material which, for example, may be polycrystalline barium titanate. When properly polarized, such a material responds in a linear manner to the fundamental component of an alternating electrical field applied thereto. A transducer element of this material exhibits, in response to an applied electric field, a motion in the direction of the electric field and a motion transverse to the electric field. The converse electro-mechanical effects also are exhibited when forces are applied to the polarized element. Polarization of the material may be obtained by the continuous application of a biasing field in the same or opposite direction to that in which the relatively weak field resulting from the signal voltage is applied, and alternatively in some circumstances remanent polarization of a titanate material may be effected by the initial application of a suitable biasing field.

Thus, expander bars or plates of these polycrystalline materials may be provided which utilize the lengthwise expansive motion transverse to an electric field applied in the thickness direction. Two or more such electroded expander bars may be affixed together along electroded surfaces thereof to form bender elements, as described and claimed in the copending application Serial No. 740,461, filed April 9, 1947, in the name of Hans Jaffe and assigned to the same assignee as the present invention, which issued on October 18, 1949, as Patent No. 2,484,950. While electro-mechanical transducers of this type may operate very satisfactorily, they nevertheless are subject to the disadvantages mentioned hereinabove in connection with the sandwich type elements containing bars cut from single crystals, and there is the added difficulty of producing by high temperature ceramic techniques bars having flat surfaces suitable for electroding and cementing together.

It is an object of the invention, therefore, to provide a new and improved electro-mechanical transducer which substantially avoids one or more of the limitations and disadvantages of the prior transducers of the type described.

It is another object of the invention to provide a new and improved electro-mechanical transducer utilizing an electro-mechanically sensitive element of ploycrystalline dielectric material.

It is a further object of the invention to provide an electro-mechanical transducer of the bender type having a simplified construction.

It is yet another object of the invention to provide a new and improved electro-mechanical transducer utilizing with improved efficiency a single body or shape of electro-mechanically sensitive material without internal interfaces.

In accordance with the invention, an electro-mechanical transducer comprises a body of polycrystalline dielectric material of the type capable of developing substantial mechanical strains when subjected to electrostatic fields, having a surface which contains lines extending in one general direction along the surface without a substantial reversal of any curvature along these lines and which is non-linear in directions at right angles to these lines, so that the body is stiffened mechanically against bending of the lines because of the non-linearity of surface. The transducer also includes mechanical means coupled to the body of dielectric material so that motion of the mechanical means is associated with bending of at least some of the aforesaid lines and involves contraction, as measured along the one direction, of at least one portion of the body adjacent some of the lines and simultaneous expansion of at least another portion of the body adjacent others of the lines. The transducer further comprises electrode means adjacent predetermined surfaces of the body.

For a better understanding of the present invention, together with other and further objects thereof, reference is had to the following description taken in connection with the accompanying drawings, and its scope will be pointed out in the appended claims.

Figure 3:
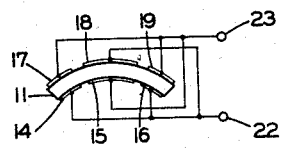
Figure 5:
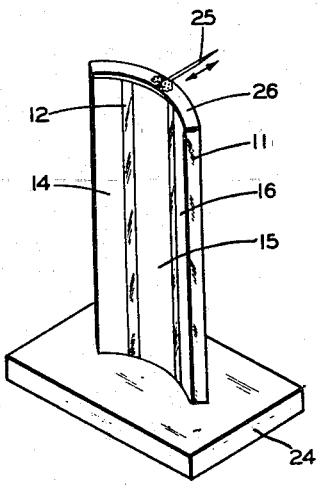
Figure 6:
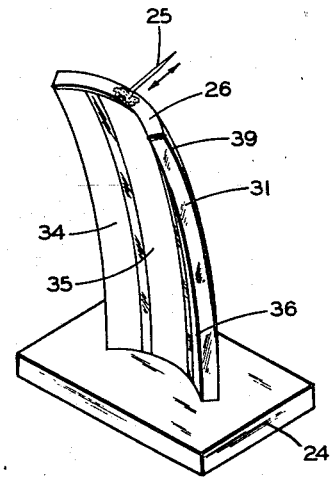
Figure 2:
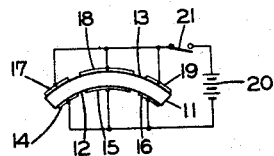
Figure 1:
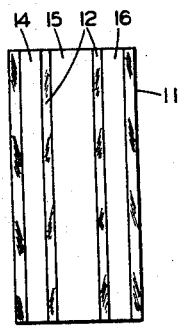
Figure 7:
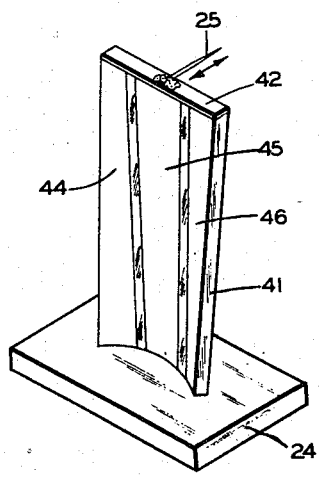
Figure 8:
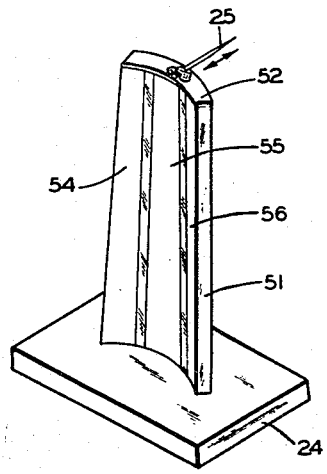
Figure 12:
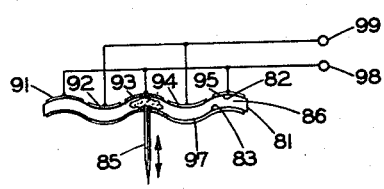
Figure 11:
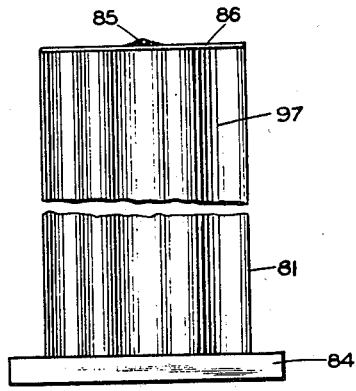
Figure 13:
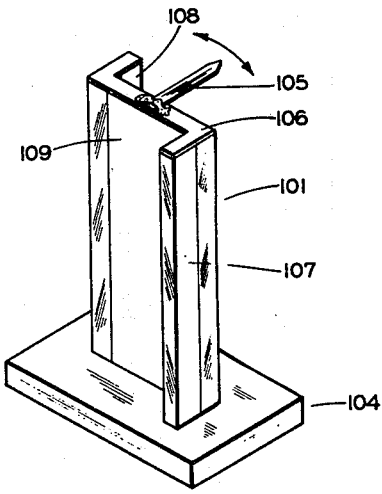
Figure 10:
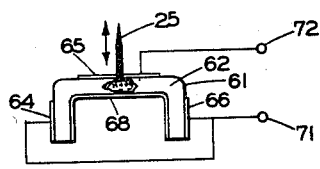
Figure 9:
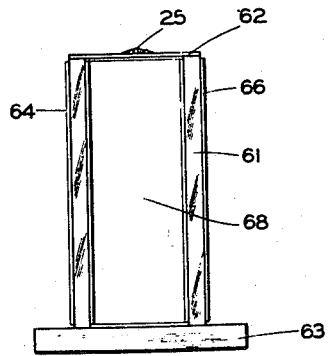

Referring to the drawings, Fig. 1 is a view in elevation of an electroded body of polycrystalline dielectric material suitable for use in a transducer embodying the present invention; Fig. 2 is a plan view of the same body showing the electrical connections of the electrodes thereon for use during initial polarization; Figs. 3 and 4 are similar plan views of the body of Fig. 1, showing alternative electrical connections of the electrodes thereon when the electroded body is used as a transducer element; Fig. 5 is a perspective view of a transducer embodying the invention and utilizing the electro-mechanically sensitive body of Fig. 1; Fig. 6 is a perspective view of a modified form of the transducer of Fig. 5; Figs. 7 and 8 illustrate in perspective additional modifications of the transducer of Fig. 5; Figs. 9 and 10 illustrate in elevation and in plan respectively another transducer embodying the present invention; Fig 11 is an elevation view of yet another embodiment of the transducer of the invention, the central part of the transducer not being shown; Fig. 12 is a plan view of the transducer of Fig. 11, showing the electrodes and suitable electrical connection thereto for operation of the transducer; and Fig. 13 is a perspective view of still another embodiment of the invention.

Referring now to Fig. 1 of the drawings, there is illustrated in elevation a thin body 11 of polycrystalline dielectric material of the type capable of developing substantial mechanical strains when subjected to electrostatic fields. A suitable dielectric material is a polycrystalline titanate material containing barium titanate. This material preferably comprises primarily barium titanate, to which may be added strontium titanate if desired to modify the electromechanical properties of the material.

As is seen in the plan view of Fig. 2, the body 11 has a concave major surface 12 and an opposed convex major surface 13, the thickness of the body being quite uniform in spite of the curvature of these major surfaces. Adjacent predetermined surfaces of the body 11, specifically both the major surface 12 and the opposed major surface 13, are electrode means, including two laterally separated electrodes 14 and 15 adjacent the major surface 12 and extending along the surface 12 in a direction which is generally longitudinal of the body 11. An electrode 16 also is provided laterally separated from the electrode 15 and similar to the electrode 14 but on the other side of electrode 15. The electrode means also includes three laterally separated electrodes 17, 18, and 19 adjacent the opposed surface 13 and disposed opposite to the electrodes 14, 15 and 16 respectively. As shown in Fig. 2, the electrodes 14, 15, and 16 are connected to each other and to one side of a source of biasing potential 20, while the electrodes 17, 18, 19 also are connected to each other and to the other side of the source 20 through a switch 21. The electrodes are advantageously made very thin, and may be, for example, strips of metal foil conductively cemented to the surfaces of the body 11 or may be made up of numerous finely divided conductive carbonaceous particles cemented together and to the surfaces by a suitable binder in a manner known to the art. Especially in the latter case, the electrodes ordinarily are so thin that they would not appear to the eye to have any thickness; nevertheless, the electrodes are shown with greatly exaggerated thickness in Fig. 2 for purposes of illustration. Except in the plan views of the drawings, the electrodes are illustrated generally as if parts of the surfaces to which they are applied.

As may be seen from the views of Figs. 1 and 2, the body 11 has a major surface, for example the surface 12, which may be thought of as containing a very large number of lines extending in one general direction along the surface. Geometrically speaking, these lines are the elementary narrow units of area which, placed side by side, make up the surface. When the one general direction referred to hereinabove is chosen as the vertical direction in the view of Fig. 1, it appears that these lines are substantially straight lines extending generally longitudinally of the body 11. Although these lines extending in the aforesaid general direction may be curved lines, they should extend along the surface without a substantial reversal of any curvature along the lines. When these lines are so chosen vertically along the surface 12, the surface extends in directions at right angles to these lines to form the cross-sectional curve seen in the plan view of Fig. 2. It appears from this plan view that the surface is non-linear in such directions at right angles to the lines, and more specifically is arcuate in such directions, so that the body 11 is stiffened mechanically against bending of the lines because of this arcuate non-linearity of surface.

In the embodiments of the invention illustrated in the drawings, it is advantageous to provide remanent polarization in the thickness direction in the dielectric material. This may be done by utilizing the electrode connections illustrated in Fig. 2. Thus, when the switch 21 is held closed for a suitable period of time, a biasing potential from the source 20 is applied in the same polarity across all of the dielectric material in the thickness direction thereof except for the narrow regions in the material adjacent the lateral separations between the electrodes. After the material has been prepolarized in this manner, the wiring connecting the electrodes as illustrated in Fig. 2 may be disconnected from the electroded body and, along with the source 20 and switch 21, retained for use in treating other similar bodies of dielectric material.

When the electroded body is to be used in a transducer, the electrode connections illustrated in the plan view of Fig. 3 may be employed. With these connections the outer electrodes 14 and 16 on the surface 12 are connected to each other and to the middle electrode 18 on the surface 13, while the middle electrode 15 on the surface 12 is connected to both of the outer electrodes 17 and 19 on the surface 13. The electrodes 14, 16, and 18 then are connected to a terminal 22, while the electrodes 15, 17, and 19 are connected to a terminal 23. The terminals 22 and 23 may be coupled either to a source of signal voltages or to a means for utilizing signal voltages appearing across these terminals, such a signal source or utilization means not being shown in the drawings since numerous forms of such devices are well known in the electro-mechanical arts. Of course, a signal source would be used if it is desired to transduce from electrical to mechanical energy, while a signal utilization means would be used if it is desired to transduce from mechanical to electrical energy.

An alternative method of connecting the electrodes for use in a transducer is illustrated in Fig. 4. In accordance with this arrangement the terminal 22 is connected to the outer electrode 16 on the surface 12, the electrodes 19 and 18 on the surface 13 are interconnected, the electrodes 15 and 14 on the surface 12 are interconnected, and the electrode 17 on the surface 13 is connected to the terminal 23.

An electro-mechanical transducer comprising the electroded body 11 is illustrated in Fig. 5. The bottom edge of the body of dielectric material is affixed firmly to a stiff base structure 24, for example by applying a strong cement to the bottom, this being the edge portion of the body nearest the portion of the surface 12 containing one end of the geometrical lines referred to hereinabove. The cemented end of the body 11 is held on the upper surface of the base 24 while the cement hardens. If desired a curved slot may be machined in the base 24 to receive the lower end of the body 11 for a short distance. To the top edge of the body 11, which is near the portion of the surface 12 containing the other end of each of the geometrical lines, there is coupled a mechanical means in the form of a shaft 25. The coupling is provided by cementing the base of the shaft 25 to a cap 26 having the shape of the top edge of the body 11 and firmly secured thereto. The electrodes on the surfaces 12 and 13 of the body 11 are connected as illustrated in Fig. 3 or in Fig. 4.

In describing the operation of the transducer of Fig. 5, it may be assumed first that forces are applied to the end of the shaft 25 tending to cause motion longitudinally of the shaft, as represented by the double-ended arrow. The resulting motion of the shaft 25 and of the top of the body 11 is in a direction generally normal to the surface 12 and is associated with bending of at least some of the lines making up that surface. Accordingly, when the shaft 25 is moved toward the left, as viewed in Fig. 5, all of these lines bend so that the tops of the lines move toward the left, while a force applied to the shaft 25 in a rightward direction causes a bending of these lines to the right. These motions of the shaft 25 in the leftward sense and in the opposite rightward sense involve contraction and expansion respectively, as measured along the longitudinal direction, of at least one portion of the body 11 adjacent some of the lines, and more specifically of the two outer portions of the body adjacent those of the lines near the two edges of the arcuate surface 12. The same motions of the shaft also involve simultaneous expansion and contraction respectively, depending on the sense of the motion, of at least another portion of the body 11 adjacent others of the lines, and more specifically of the central portion of the body adjacent those of the lines near the middle of the arcuate surface 12. The electrodes 14 and 16 and the third electrode 15 adjacent the surface 12 are individually adjacent the two outer portions and the central portion respectively of the body 11. Thus, for a leftward movement of the shaft 24, corresponding to a downward movement of the top of the body 11 as viewed in Fig. 3, the motion involves contraction of the outer portions of the body 11 adjacent the two pairs of electrodes 14, 17 and 16, 19 and simultaneous expansion of the central portion of the body adjacent the pair of electrodes 15, 18. As a result of the electro-mechanical response of the material in a direction transverse to the direction of polarization, that is, in the vertical direction as seen in Fig. 5, a signal voltage of one polarity appears across the first-mentioned pairs of electrodes adjacent the portions of the body suffering contraction, while a signal voltage of the opposite polarity appears across the last-mentioned pair of electrodes adjacent the portion of the body suffering expansion. Since, as illustrated in Fig. 3, the last-mentioned pair of electrodes 15, 18 is connected to the terminals 22, 23 in the opposite sense from that of the connections from the first-mentioned pairs of electrodes, the signals applied to the terminals from the various pairs of electrodes have the same polarity and reenforce each other. If the shaft 25 is moved in the opposite sense, the portions of the body 11 which suffered contraction and expansion now suffer expansion and contraction respectively, causing a reversal of polarity at the terminals 22, 23. In a manner well known to those familiar in the art, the application of a signal voltage across the terminals 22, 23 causes a motion of the shaft 25, by reason of the converse electromechanical response of the transducer.

When the electrodes are connected as illustrated in Fig. 4 and the shaft 25 is moved in one sense, electrical charges accumulate on the electrodes 14—19 just as is the case with the connections illustrated in Fig. 3. The polarity of the voltages across the three pairs of electrodes resulting from the charges thus developed is indicated in Fig. 4. It will be seen that the three pairs of electrodes are connected in series in the Fig. 4 arrangement to effect addition of these voltages. Hence the signal obtained with the Fig. 4 arrangement will have a higher voltage than that obtained with the Fig. 3 arrangement. Conversely, application of a given voltage to the terminals 22, 23 for these two types of electrode connections causes a smaller motion of the shaft 25 in the case of the Fig. 4 arrangement.

The transducer shown in perspective in Fig. 6 is the same as the Fig. 5 transducer except that, when in an unstressed condition, the longitudinal lines making up the curved major surfaces of the dielectric body are not straight lines. The lateral cross-section is arcuate, as with the Fig. 5 transducer. The transducer shown in Fig. 6 comprises a thin titanate body 31 firmly affixed to a base 24 identical with the base shown in Fig. 5. The body 31 has electrodes 34, 35, and 36 on one major face, while corresponding electrodes are provided on the opposed major face, of which a corner of the electrode 39 opposite the electrode 36 is visible in Fig. 6. For mechanical coupling to the transducer a shaft 25 and cap 26 are fastened to the top of the body 31, just as in the Fig. 5 arrangement.

When the electroded body 31 of the Fig. 6 arrangement is stressed by applying a force to its shaft 25 in a direction indicated by the double-ended arrow, the stiffening effect of the arcuate transverse shape causes simultaneous contraction and expansion individually of the outer and central portions of the titanate body, resulting in an electrical charge appearing on the electrodes. The action is entirely analogous to that of the Fig. 5 arrangement, and the electrodes may be connected in accordance with the scheme illustrated in either Fig. 3 or Fig. 4. Since there is no reversal of the curvature along the longitudinal lines in the surfaces of the body 31, this curvature does not tend undesirably to cause the lines to buckle during application of forces to the shaft 25. Consequently, the arcuate curvature in the transverse direction is effective to stiffen the body in the same manner as with the Fig. 5 arrangement.

As illustrated by the arrangements of Figs. 7 and 8, the curvature in the transverse direction need not be the same along the entire length of a transducer of the type shown in Fig. 5 or Fig. 6. Thus, in Fig. 7 a titanate body 41 is mounted on a base 24 and provided with a shaft 25 fastened to a cap 42. Outer electrodes 44, 46 and an inner electrode 45 are provided on one major surface of the body 41, while corresponding electrodes are placed on the opposed major surface. At the region where the body 41 is affixed to the base 24 it has the same shape as in the Fig. 5 arrangement, but the arcuate curvature diminishes toward the top of the body until, where the cap 42 is affixed to the body, the cross-sectional shape has become linear. Hence, there is a small portion at the top of the body 41 which is not non-linear in directions at right angles to the longitudinal lines in the major surface of the body. A body shaped as in Fig. 7 is stiffest where the lateral curvature is greatest, that is, at the base; thus the mechanical resistance to the bending occasioned by a force applied to the body through the shaft 25 and cap 42 at the top thereof is greatest where the bending moment of this applied force is greatest. This results in a desirably uniform stress distribution within the dielectric body. The electrode connections again may be as illustrated in either Fig. 3 or Fig. 4.

The transducer illustrated in perspective in Fig. 8 again is similar to that of Fig. 5. It comprises the base 24 and a titanate body 51 which has major surfaces made up of essentially straight lines in the longitudinal direction but which is arcuate in the lateral direction to provide a surface having the same radius of curvature throughout the length of the body. The shaft 25 is coupled to the top of the body 51 by a cap 52 curved similarly to the cap 26 in the Fig. 1 arrangement but shorter than the cap 26. The edges of the body 51 are tapered in the upward direction so that the body becomes progressively narrow toward the top thereof. Consequently the electrodes 54, 55, and 56, visible in the perspective view of Fig. 8, also are made narrower toward the top. These electrodes may be interconnected as are the electrodes of the Fig. 5 arrangement. The transducers illustrated in Figs. 5 and 8 operate in an entirely analogous manner. However, the narrower cross-sectional area of the body 51 toward the top thereof causes the upper portions of that body to be less stiff, resulting in the same favorable condition of stress distribution as is obtained with the Fig. 7 arrangement.

While an arcuate transverse shape may be desirable in many cases, the same stiffening against bending may be obtained with other non-linear curvatures transverse to the lines extending along a major surface of the titanate body. Thus, in the arrangement illustrated in Figs. 9 and 10, the body 61 has a flat central portion and two outer portions bent at roughly 90° to the central portion. One major surface of the body 61 is provided with electrodes 64, 66 adjacent the outer portions of the body and an electrode 65 adjacent the central portion of the body. A single large electrode 68 covers the opposed major surface. The shaft 25 is fastened to a cap member 62 affixed to the top of the body 61. The bottom of the body is affixed firmly to a base 63. The outer electrodes 64, 66 are connected to one terminal 71, while the middle electrode 65 is connected to the other terminal 72. Since the stiffening effect of the bent outer portions of the body is quite great, these bent portions may be relatively short. Again the operation is analogous to that of the Fig. 5 arrangement. When the shaft 24 is forced forward in the direction of the arrow, Fig. 10, the lower ends of the bent outer portions are forced against the base 63, while the central portion tends to pull away from the base. This results in contraction of the outer portions and expansion of the central portion, causing charges of one polarity on the electrodes 64, 66 and a charge of the opposite polarity on the electrode 65. With the electrodes interconnected as illustrated in Fig. 10, the electrodes 64, 66 are connected in shunt, and this shunt-connected pair of electrodes in turn is connected in series with the electrode 65 by the interposition of the common electrode 68.

While a reversal of curvature of the lines which are to be bent during operation of a transducer of the type described would tend to defeat the stiffening effect of the non-linearity of surface in directions at right angles to these lines, one or more reversals of curvature in the last-mentioned directions at right angles to the lines has the opposite effect. A transducer utilizing a dielectric body having at least one reversal, and in this case four reversals, of curvature in the transverse direction is shown in Figs. 11 and 12, the curvature appearing particularly in the plan view of Fig. 12. There is shown a body 81 of titanate material having a major surface 82 and an opposed major surface 83. These surfaces contain substantially straight lines extending in a vertical direction as viewed in Fig. 11. The multiple reversals of curvature of the surface 82 in the lateral direction result in the formation of three convex portions thereof adjacent the outer and central portions of the body and two concave portions thereof adjacent the two portions of the body intermediate those portions. The convex and concave portions of the surface 82 are adjacent corresponding convex and concave portions of the body 81, effecting stiffening of the body mechanically against bending of the longitudinal lines making up the surface.

The body 81 is affixed firmly to a base 84 and is provided with a cap 86 to which is secured a shaft 85 for movement in either of two senses as indicated by the double-ended arrow. Motion of the shaft 85 in the sense corresponding to an upward displacement, as viewed in Fig. 12, is associated with bending of the aforesaid vertical lines and involves contraction, as measured longitudinally of the body, of the convex portions and simultaneous expansion of the concave portions of the body mentioned hereinabove. A plurality of laterally separated electrodes is provided adjacent the surface 82, and more particularly, adjacent individual ones of the convex and concave portions of the body. Thus the electrodes 91—95 are provided, the electrodes 91, 93, and 95 being adjacent the convex portions and the electrodes 92 and 94 being adjacent the concave portions of the body as viewed looking toward the surface 82. The opposed surface 83 is covered by a large electrode 97.

Motion of the shaft 85, producing simultaneous contraction and expansion of the convex and concave portions respectively of the body, as described hereinabove, produces electrical charges of opposite polarities on the electrodes opposite the respective portions. By connecting the electrodes 91, 93, and 95 adjacent the convex portions to a terminal 98 and the electrodes 92 and 94 adjacent the concave portions to a terminal 99 the convex portions are placed in shunt with each other and, by virtue of the common electrode 97, in series with the concave portions, which are also in shunt with each other.

Fig. 13 illustrates an embodiment of the invention in which a rotational motion is converted mechanically into a bending of parts of the dielectric body to produce an electrical signal, or vice versa. To accomplish this a dielectric body 101 has a flat central portion and two outer portions disposed at approximately 90° thereto, as in the arrangement of Figs. 9 and 10, but with the outer portions extending in opposite directions. The body 101 is affixed firmly to a stiff base structure 104 and is provided with a suitable cap 106 and flat shaft 105 adapted to be rotated as indicated by the double-ended arrow. Three pairs of electrodes are provided, including electrodes 107 and 108 adjacent the two outer portions of the body and an electrode 109 adjacent the central portion of the body. Each of these electrodes has an opposed electrode (not visible in Fig. 13) on the opposite surface. A clockwise rotational motion, as viewed from the top of the transducer, of the shaft 105 is associated with a mechanical reaction between the body 101 and the base 104 such as to involve a leftward bending of the portions of the body 101 seen toward the front in the view of Fig. 13 and a rightward bending of the portions of the body seen toward the rear in that view. This resultant bending motion involves contraction of the outer portions of the body and expansion of most of the flat central portion, resulting in the production of electrical charges on the electrodes much as in the arrangements of Fig. 5 and of Figs. 9 and 10. Conversely, application of signal voltages to the electrodes, when interconnected in a manner analogous to that shown in Fig. 3 or Fig. 4, causes rotational motions of the shaft 105. The longitudinal lines directly beneath the point where the shaft 105 is fastened to the cap 106 suffer little or no bending during these rotational motions.

The dielectric bodies illustrated in the drawings may be formed in any convenient manner. For example, the body 81 of undulating cross section, shown in Figs. 11 and 12, may be formed from a rectangular blank of barium titanate material. Suitable dimensions for the blank might be 1¼ inches long, ⅝ inch wide, and about 0.040 inch thick. This blank is machined to the undulating shape illustrated in the plan view of Fig. 12, forming a thin body about 0.020 inch in thickness between the major surfaces 82 and 83.

While there have been described what are at present considered to be the preferred embodiments of this invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. An electro-mechanical transducer comprising: a body of polycrystalline dielectric material of the type capable of developing substantial mechanical strains when subjected to electrostatic fields, having a surface which contains lines extending in one general direction along said surface without a substantial reversal of any curvature along said lines and which is non-linear in directions at right angles to said lines, so that said body is stiffened mechanically against bending of said lines because of said non-linearity of surface; mechanical means coupled to said body so that motion of said means is associated with bending of at least some of said lines and involves contraction, as measured along said one direction, of at least one portion of said body adjacent some of said lines and simultaneous expansion of at least another portion of said body adjacent others of said lines; and electrode means adjacent predetermined surfaces of said body.

2. An electro-mechanical transducer comprising a body of polycrystalline titanate material of the type capable of developing substantial mechanical strains when subjected to electrostatic fields, having a surface which contains lines extending in one general direction along said surface without a substantial reversal of any curvature along said lines and which is non-linear in directions at right angles to said lines, so that said body is stiffened mechanically against bending of said lines because of said non-linearity of surface; mechanical means coupled to said body so that motion of said means is associated with bending of at least some of said lines and involves contraction, as measured along said one direction, of at least one portion of said body adjacent some of said lines and simultaneous expansion of at least another portion of said body adjacent others of said lines; and electrode means adjacent predetermined surfaces of said body.

3. An electro-mechanical transducer comprising: a body of polycrystalline material comprising primarily barium titanate, having a surface which contains lines extending in one general direction along said surface without a substantial reversal of any curvature along said lines and which is non-linear in directions at right angles to said lines, so that said body is stiffened mechanically against bending of said lines because of said non-linearity of surface; mechanical means coupled to said body so that motion of said means is associated with bending of at least some of said lines and involves contraction, as measured along said one direction, of at least one portion of said body adjacent some of said lines and simultaneous expansion of at least another portion of said body adjacent others of said lines; and electrode means adjacent predetermined surfaces of said body.

4. An electro-mechanical transducer comprising: a body of polycrystalline dielectric material of the type capable of developing substantial mechanical strains when subjected to electrostatic fields, having a surface which contains lines extending in one general direction along said surface without a substantial reversal of any curvature along said lines and which is non-linear in directions at right angles to said lines, so that said body is stiffened mechanically against bending of said lines because of said non-linearity of surface; mechanical means coupled to said body so that motion of said means is associated with bending of at least some of said lines and involves contraction, as measured along said one direction, of at least one portion of said body adjacent some of said lines and simultaneous expansion of at least another portion of said body adjacent others of said lines; and electrode means adjacent predetermined surfaces of said body and including two laterally separated electrodes extending in said one direction and individually adjacent said one portion and said other portion of said body.

5. An electro-mechanical transducer comprising: a thin body of polycrystalline dielectric material of the type capable of developing substantial mechanical strains when subjected to electrostatic fields, having a major surface which contains lines extending in one general direction along said surface without a substantial reversal of any curvature along said lines and which is non-linear in directions at right angles to said lines, so that said body is stiffened mechanically against bending of said lines because of said non-linearity of surface; mechanical means coupled to said body so that motion of said means is associated with bending of at least some of said lines and involves contraction, as measured along said one direction, of at least one portion of said body adjacent some of said lines and simultaneous expansion of at least another portion of said body adjacent others of said lines; and electrode means adjacent both said major surface and the opposed major surface of said thin body and including two laterally separated electrodes adjacent one of said major surfaces, extending in said one direction, and individually adjacent said one portion and said other portion of said body.

6. An electro-mechanical transducer comprising: a body of polycrystalline dielectric material of the type capable of developing substantial mechanical strains when subjected to electrostatic fields, having a surface which contains substantially straight lines extending in one direction along said surface and which is non-linear in directions at right angles to said lines, so that said body is stiffened mechanically against bending of said lines because of said non-linearity of surface; mechanical means coupled to said body so that motion of said means is associated with bending of at least some of said lines and involves contraction, as measured along said one direction, of at least one portion of said body adjacent some of said lines and simultaneous expansion of at least another portion of said body adjacent others of said lines; and electrode means adjacent predetermined surfaces of said body.

7. An electro-mechanical transducer comprising: a body of polycrystalline dielectric material of the type capable of developing substantial mechanical strains when subjected to electrostatic fields, having a surface which contains lines extending in one general direction along said surface without a substantial reversal of any curvature along said lines and which is arcuate in directions at right angles to said lines, so that said body is stiffened mechanically against bending of said lines because of said arcuate non-linearity of surface; mechanical means coupled to said body so that motion of said means is associated with bending of at least some of said lines and involves contraction, as measured along said one direction, of at least one portion of said body adjacent some of said lines and simultaneous expansion of at least another portion of said body adjacent others of said lines; and electrode means adjacent predetermined surfaces of said body.

8. An electro-mechanical transducer comprising: a body of polycrystalline dielectric material of the type capable of developing substantial mechanical strains when subjected to electrostatic fields, having a surface which contains lines extending in one general direction along said surface without a substantial reversal of any curvature along said lines and which is arcuate in directions at right angles to said lines, so that said body is stiffened mechanically against bending of said lines because of said arcuate non-linearity of surface; mechanical means coupled to said body so that motion of said means in one sense and in the opposite sense is associated with bending of at least some of said lines in the respective senses and involves contraction and expansion respectively, as measured along said one direction, of the two outer portions of said body adjacent those of said lines near the two edges of said arcuate surface and also involves simultaneous expansion and contraction respectively of the central portion of said body adjacent those of said lines near the middle of said arcuate surface; and electrode means adjacent predetermined surfaces of said body and including three laterally separated electrodes adjacent said arcuate surface, extending in said one direction, and individually adjacent said two outer portions and said central portion of said body.

9. An electro-mechanical transducer comprising: a body of polycrystalline dielectric material of the type capable of developing substantial mechanical strains when subjected to electrostatic fields, having a surface which contains lines extending in one general direction along said surface without a substantial reversal of any curvature along said lines and which has at least one reversal of curvature in directions at right angles to said lines, said last-mentioned curvature of said surface forming at least one convex portion and at least one concave portion thereof adjacent corresponding convex and concave portions of said body and stiffening said body mechanically against bending of said lines; mechanical means coupled to said body so that motion of said means is associated with bending of at least some of said lines and involves contraction, as measured along said one direction, of at least one portion of said body adjacent some of said lines and simultaneous expansion of at least another portion of said body adjacent others of said lines; and electrode means adjacent predetermined surfaces of said body and including a plurality of laterally separated electrodes adjacent said surface, extending in said one direction, and adjacent individual ones of said convex and concave portions of said body.

10. An electro-mechanical transducer comprising: a body of polycrystalline dielectric material of the type capable of developing substantial mechanical strains when subjected to electrostatic fields, having a surface which contains lines extending in one general direction along said surface without a substantial reversal of any curvature along said lines and which has at least one reversal of curvature in directions at right angles to said lines, said last-mentioned curvature of said surface forming at least one convex portion and at least one concave portion thereof adjacent corresponding convex and concave portions of said body and stiffening said body mechanically against bending of said lines; mechanical means coupled to said body so that motion of said means in one sense is associated with bending of at least some of said lines and involves contraction, as measured along said one direction, of said convex portions of said body and simultaneous expansion of said concave portions of said body; and electrode means adjacent predetermined surfaces of said body and including a plurality of laterally separated electrodes adjacent said surface, extending in said one direction, and individually adjacent each of said convex and concave portions of said body.

11. An electro-mechanical transducer comprising: a base structure; a body of polycrystalline dielectric material of the type capable of developing substantial mechanical strains when subjected to electrostatic fields, having a surface which contains lines extending in one general direction along said surface without a substantial reversal of any curvature along said lines and which is non-linear in directions at right angles to said lines, so that said body is stiffened mechanically against bending of said lines because of said non-linearity of surface, said body being affixed firmly to said base structure near the portion of said surface containing one end of said lines; mechanical means coupled to said body near the portion of said surface containing the other end of said lines so that motion of said means in a direction generally normal to said surface is associated with bending of at least some of said lines and involves contraction, as measured along said one direction, of at least one portion of said body adjacent some of said lines and simultaneous expansion of at least another portion of said body adjacent others of said lines; and electrode means adjacent predetermined surfaces of said body.

12. An electro-mechanical transducer comprising: a body of polycrystalline dielectric material of the type capable of developing substantial mechanical strains when subjected to electrostatic fields, having a surface which contains lines extending in one general direction along said surface without a substantial reversal of any curvature along said lines and which is non-linear in directions at right angles to said lines, so that said body is stiffened mechanically against bending of said lines because of said non-linearity of surface; mechanical means affixed to said body so that rotational motion of said means and the corresponding rotational motion of the region of said body affixed to said means are associated with bending of some of said lines and involve contraction, as measured along said one direction, of at least one portion of said body adjacent certain of said lines and simultaneous expansion of at least another portion of said body adjacent certain others of said lines; and electrode means adjacent predetermined surfaces of said body.

13. An electro-mechanical transducer comprising: a stiff base structure; a body of polycrystalline dielectric material of the type capable of developing substantial mechanical strains when subjected to electrostatic fields, having a surface which contains lines extending in one general direction along said surface without a substantial reversal of any curvature along said lines and which is non-linear in directions at right angles to said lines, so that said body is stiffened mechanically against bending of said lines because of said non-linearity of surface, said body being affixed firmly to said base structure near the portion of said surface containing one end of said lines; mechanical means affixed to said body near the portion of said surface containing the other end of said lines so that rotational motion of said means and the corresponding rotational motion of the region of said body affixed to said means are associated with a mechanical reaction between said body and said stiff base structure such as to involve bending of some of said lines, said motion involving contraction, as measured along said one direction, of at least one portion of said body adjacent certain of said lines and simultaneous expansion of at least another portion of said body adjacent certain others of said lines; and electrode means adjacent predetermined surfaces of said body.

CHARLES K. GRAVLEY.

REFERENCES CITED

The following references are of record in the file of this patent:

"Dielectric and Piezoelectric Properties of Barium Titanate," by Shepard Roberts, from Physical Review, vol. 71, No. 12, of June 15, 1947, pages 890–895, inclusive.